United States Patent
Kuo et al.

(10) Patent No.: US 9,148,295 B2
(45) Date of Patent: Sep. 29, 2015

(54) CABLE SET-TOP BOX WITH INTEGRATED CABLE TUNER AND MOCA SUPPORT

(75) Inventors: Jonathan Kuo, Alisio Viejo, CA (US); Phong Thanh Tran, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 924 days.

(21) Appl. No.: 12/829,936

(22) Filed: Jul. 2, 2010

(65) Prior Publication Data

US 2011/0197243 A1 Aug. 11, 2011

Related U.S. Application Data

(60) Provisional application No. 61/302,817, filed on Feb. 9, 2010.

(51) Int. Cl.
| | | |
|---|---|---|
| *H04N 7/173* | (2011.01) | |
| *H04L 12/28* | (2006.01) | |
| *H04N 21/436* | (2011.01) | |
| *H04N 21/61* | (2011.01) | |

(52) U.S. Cl.
CPC ........ *H04L 12/2801* (2013.01); *H04L 12/2834* (2013.01); *H04N 21/43615* (2013.01); *H04N 21/6118* (2013.01); *H04N 21/6168* (2013.01)

(58) Field of Classification Search
None
See application file for complete search history.

(56) References Cited

U.S. PATENT DOCUMENTS

| | | | |
|---|---|---|---|
| 5,491,516 A * | 2/1996 | Casavant et al. | 375/240.12 |
| 6,751,441 B1 * | 6/2004 | Murray et al. | 455/7 |
| 6,922,739 B2 * | 7/2005 | Core | 710/22 |
| 7,219,367 B2 * | 5/2007 | Briggs | 725/139 |
| 7,817,642 B2 * | 10/2010 | Ma et al. | 370/395.4 |
| 8,010,061 B2 * | 8/2011 | Erkocevic et al. | 455/101 |
| 8,555,082 B1 * | 10/2013 | Bibikar et al. | 713/189 |
| 2003/0095447 A1 * | 5/2003 | Dean | 365/200 |
| 2004/0123322 A1 | 6/2004 | Erkocevic et al. | |
| 2004/0194147 A1 | 9/2004 | Craven et al. | |
| 2004/0210941 A1 * | 10/2004 | Poli et al. | 725/132 |
| 2006/0090084 A1 | 4/2006 | Buer | |
| 2006/0117371 A1 | 6/2006 | Margulis | |
| 2007/0217436 A1 | 9/2007 | Markley et al. | |
| 2008/0043781 A1 * | 2/2008 | Taskiran et al. | 370/509 |
| 2008/0120667 A1 * | 5/2008 | Zaltsman | 725/110 |

(Continued)

FOREIGN PATENT DOCUMENTS

| | | |
|---|---|---|
| CN | 101472111 A | 7/2009 |
| EP | 2 073 541 A2 | 6/2009 |
| WO | WO 2010/087913 A2 | 8/2010 |

OTHER PUBLICATIONS

Search Report for European Patent Application No. EP11000865.3, dated Jul. 22, 2011, 7 pages.

(Continued)

*Primary Examiner* — Oschta Montoya
(74) *Attorney, Agent, or Firm* — Sterne, Kessler, Goldstein & Fox PLLC

(57) ABSTRACT

A cable set-top box system with integrated cable tuners and MoCA may implemented on a single integrated circuit, supporting communication over a shared coaxial cable line. The system may include a memory interface shared by DOCSIS and video/audio subsystems. The system may further include an embedded processor in the MoCA subsystem, enabling autonomous operation of the MoCA subsystem and secure flash memory that is not directly accessible by the DOCSIS subsystem.

21 Claims, 4 Drawing Sheets

(56) References Cited

U.S. PATENT DOCUMENTS

| | | | |
|---|---|---|---|
| 2008/0134276 A1* | 6/2008 | Orrell et al. | 725/132 |
| 2008/0145037 A1* | 6/2008 | Murase | 386/126 |
| 2008/0155275 A1* | 6/2008 | Natarajan et al. | 713/193 |
| 2008/0219494 A1* | 9/2008 | Chen | 382/100 |
| 2009/0059933 A1* | 3/2009 | Huang et al. | 370/401 |
| 2009/0165070 A1 | 6/2009 | McMullin et al. | |
| 2009/0327384 A1* | 12/2009 | Petrovic | 708/300 |
| 2010/0095339 A1* | 4/2010 | Rattin et al. | 725/111 |
| 2010/0131968 A1* | 5/2010 | Newell et al. | 725/4 |
| 2011/0058813 A1* | 3/2011 | Boyd et al. | 398/68 |
| 2011/0281543 A1* | 11/2011 | White et al. | 455/337 |

OTHER PUBLICATIONS

Office Action in EP Application No. 11 000 865.3, European Patent Office, Netherlands, dated Mar. 21, 2013.

Office Action directed to related Chinese Patent Application No. 201110035167.8, mailed on Nov. 22, 2012; 6 pages.

Office Action directed to related Taiwanese Patent Application No. 100104322, mailed on Nov. 12, 2014; 5 pages.

* cited by examiner

CABLE SET-TOP BOX WITH INTEGRATED CABLE TUNER AND MOCA SUPPORT

CROSS REFERENCE TO RELATED APPLICATIONS

This application claims the benefit of U.S. Provisional Application No. 61/302,817, filed Feb. 9, 2010, entitled "CABLE SET-TOP BOX WITH INTEGRATED CABLE TUNER AND MOCA SUPPORT," which is incorporated herein by reference in its entirety.

BACKGROUND OF THE INVENTION

1. Field of the Invention

The present invention generally relates to cable set top box systems and specifically to a high definition cable set top box system with an integrated cable tuner and MoCA subsystem.

2. Background Art

Cable set top boxes are commonly used to receive and decode digital television broadcasts and to interface with the internet through the user's television.

Previous cable set-top box implementations do not have integrated tuners. For home-networking, prior cable set-top box implementations use Ethernet or an external MoCA system.

What is needed is a cable set top box system with an integrated cable tuner and a MoCA subsystem.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Figure 1:
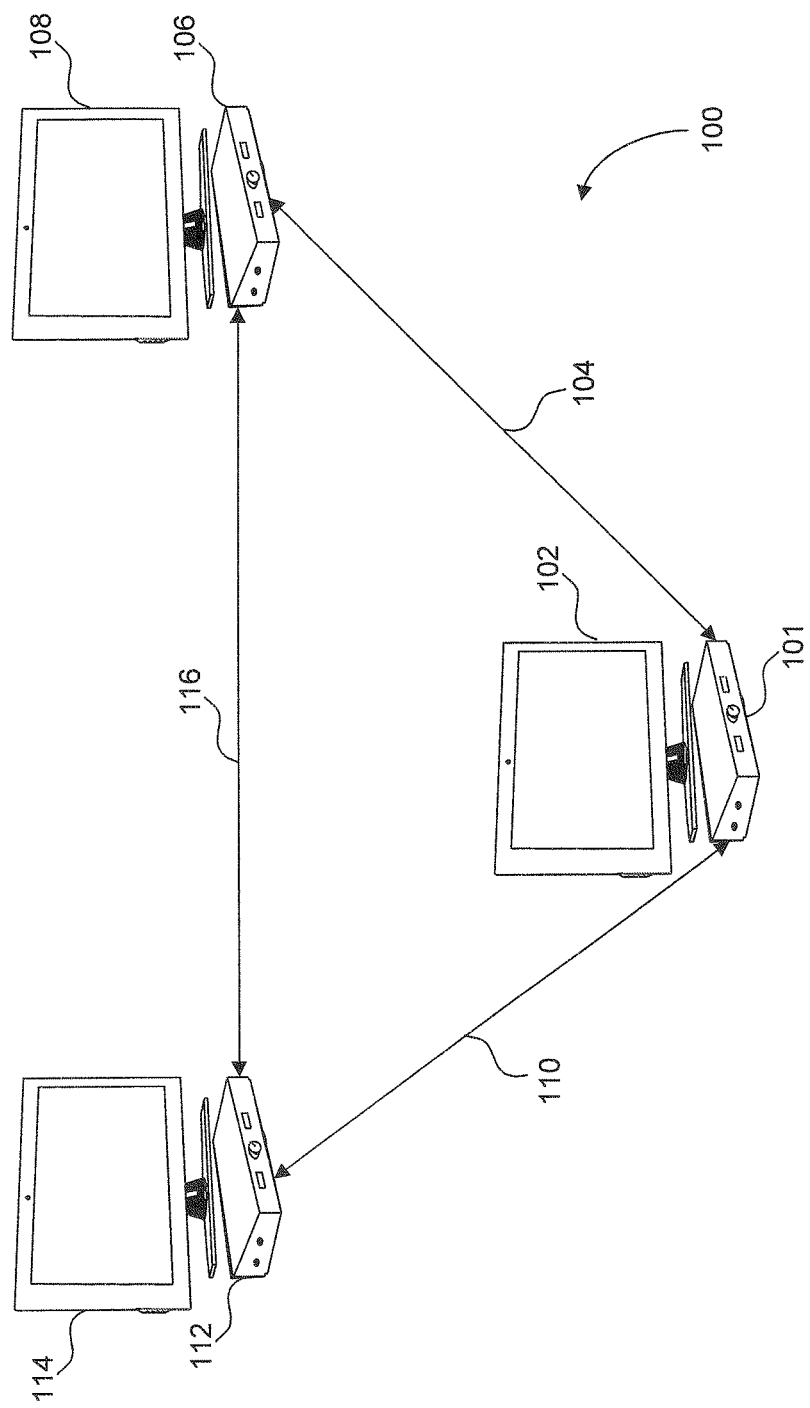
FIG. 1 depicts an exemplary network of cable set top boxes according to one embodiment.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A high-definition cable set-top box system on an integrated circuit with integrated tuners and support for the Multimedia Over Coax Alliance (MoCA) standard is provided. By integrating cable tuners into a single integrated circuit (chip), board space is reduced, allowing for a smaller foam-factor cable set-top box. MoCA integration also helps reduce cable set-top box form factor and additionally allows for home networking on the same cable network in the house without requiring a separate network such as Ethernet or USB. The system may include a memory interface shared by Data Over Cable Service Interface Specification ("DOCSIS") and video/audio subsystems. The system may further include an embedded processor in the MoCA subsystem, enabling autonomous operation of the MoCA subsystem and secure flash memory that is not directly accessible by the DOCSIS subsystem.

Embodiments of the system may be implemented on a single integrated circuit, reducing board space, allowing for smaller form factor cable set-top box, and allowing for home networking on the same cable network in the home without requiring a separate network for MoCA support, such as Ethernet or Universal Serial Bus ("USB"). Advantageously, solutions provided by embodiments disclosed herein allow for MoCA support using existing coaxial cable lines. Further, the memory interface may be merged into a single architecture shared by both the front end and the back end of the integrated circuit and designed to meet the requirements of both the front end and the back end, including security requirements.

In an embodiment, a cable set-top box solution is provided offering integrated Advanced Video Coding ("AVC") (H.264/MPEG-4 Part 10), Moving Picture Experts Group ("MPEG"), MPEG-4 Part 2, MPEG-2, and SMPTE 421M video codec standard ("VC-1") video decoding technology. DivX, H.264, Audio Video Standard ("AVS"), and XviD formats may also be supported.

In an embodiment, a Data Over Cable Service Interface Specification (DOCSIS) subsystem is also provided to support transfer of cable television data. The DOCSIS subsystem integrates dual tuners. Additionally, the DOCSIS subsystem provides two integrated downstream demodulators supporting up to 1024 Quadrature Amplitude Modulation ("QAM"), an Out-of-band ("OOB") demodulator, an upstream modulator supporting rate up to 256 QAM, a DOCSIS 3.0 MAC capable of bonding up to four channels, a transmission convergence module supporting mapping for both Synchronous Code Division Multiple Access ("SCDMA") and Advanced Time Division Multiple Access ("ATDMA"), and a dual-thread MIPS32 processor core with 800 DMIPS rating.

In an embodiment, the video/audio subsystem includes a data transport processor, a high-definition advanced video decoder, an advanced audio decoder, a 2d/3D graphics engine, motion adaptive de-interlacing, high quality video processing hardware, six video Digital to Analog Converters ("DACs"), and stereo high-fidelity audio DACs. The video/audio subsystem may be managed by a MIPS 4380 class processor with a Floating Point Unit ("FPU"). Additionally, the video decoder may be designed to output up to a 1080p60 (1,080 lines of vertical resolution and 30 progressive scan frames per second) output format.

In an embodiment, various interfaces are added to support all required set-top box functions such as Infrared ("IR") remote, Light-emitting Diode ("LED"), Keypads, Universal Asynchronous Receiver/Transmitter ("UARTs"), Inter-Integrated Circuit ("I²C"), and System Packet Interface ("SPI"). A Serial Advanced Technology Attachment ("SATA") interface may be included to support Personal Video Recorder ("PVR") capability, and two USB 2.0 ports may also be provided. A 10/100 Ethernet Physcial ("PHY") Layer/Media Access Control ("MAC") Layer may be integrated for home networking, and a MoCA module with tuner, receiver, and DAC may also be integrated into the system.

2. System

The Multimedia Over Coax Alliance (MoCA) standard supports networking (for example, home networking) over existing coaxial cable infrastructure. Devices, such as cable set top boxes, incorporating MoCA functionality can communicate over coaxial cable with other devices connected to a network.

2.1 Network Architecture

FIG. 1 depicts an exemplary network 100 of cable set top boxes according to one embodiment. Each cable set top box (101, 106, and 112) may output to one or more display devices, such as a television (102, 108, and 114). Cable set top boxes 100, 106, and 112 may include on-chip MoCA modules, enabling them to communicate (104, 110, and 116) with each other over existing coaxial cable infrastructure.

Home networking with MoCA functionality according to various embodiments presents several advantages. For example, a first cable set top box 101 configured to output to a television 102 in a family room may have access to internet through an Ethernet connection. Internet data from the first cable set top box 101 in the family room may be sent to a second cable set top box 106 configured to output to a television 108 in a master bedroom. MoCA subsystems in the first cable set top box 101 and the second cable set top box 106 enable the cable set top boxes to communicate 104 over coaxial cable, and data may be sent from the first cable set top box 101 to the second cable set top box 106 using the MoCA subsystems in each cable set top box. For example, using this functionality, the second cable set top box 106 may access internet data received by the first cable set top box 101 even if the second cable set top box 106 is not directly connected to the internet. Further, for example, using MoCA functionality, the second cable set top box 106 may access television channel from the first cable set top box 101. Additionally, by using SATA subsystems on-chip in each cable set top box, stored television data from another room may be paused and/or time shifted.

2.2 Integration

Solutions provided by various embodiments support integration of cable tuners and MoCA on the same integrated circuit in a device, such as a cable set-top box. This integration advantageously allows for networking, using the same cable infrastructure for both the cable tuners and MoCA functionality, and thus avoids the need for separate networks for the cable tuners and MoCA support.

2.3 Memory Interface and Security

In an embodiment, the memory interface for the system is merged into a single architecture. For example, only one Double Data Rate ("DDR") memory is shared by a front end and a back end of a system according to an embodiment. Embodiments further include a memory interface that supports concurrent operation of two subsystems: DOCSIS and the video/audio subsystem, which are explained below in further detail with reference to FIG. 2. The DOCSIS and video/audio subsystems each have bandwidth and memory requirements and access on-chip DDR memory and flash memory interfaces configured to interface with off-chip DDR memory and flash memory.

Additionally, both the DOCSIS and the video/audio subsystems have security requirements. For example, if the DOCSIS and video/audio subsystems run concurrently and share the same memory (for example, DDR memory), the DDR memory may be hacked into, and video and audio content may be stolen.

To address these concerns, all of the code in the DDR memory may be authenticated before it is run. Additionally, the DOCSIS subsystem may be prevented from accessing the flash interface directly—instead, the DOCSIS may be required to use the audio/video processor in the host before it can access flash memory.

2.4 MoCA Design

Embodiments further provide an on-chip MoCA subsystem for networking over existing coaxial cable infrastructure. In an embodiment, the MoCA subsystem is configured for autonomous operation (with respect to a host Central Processing Unit ("CPU")) by using an embedded CPU in the MoCA subsystem. For example, the embedded CPU is configured to access (and run code from) memory directly through the system bus, and the embedded CPU handshakes with the main CPU of the integrated circuit.

3. Embodiments

3.1 System on an Integrated Circuit

Figure 2:
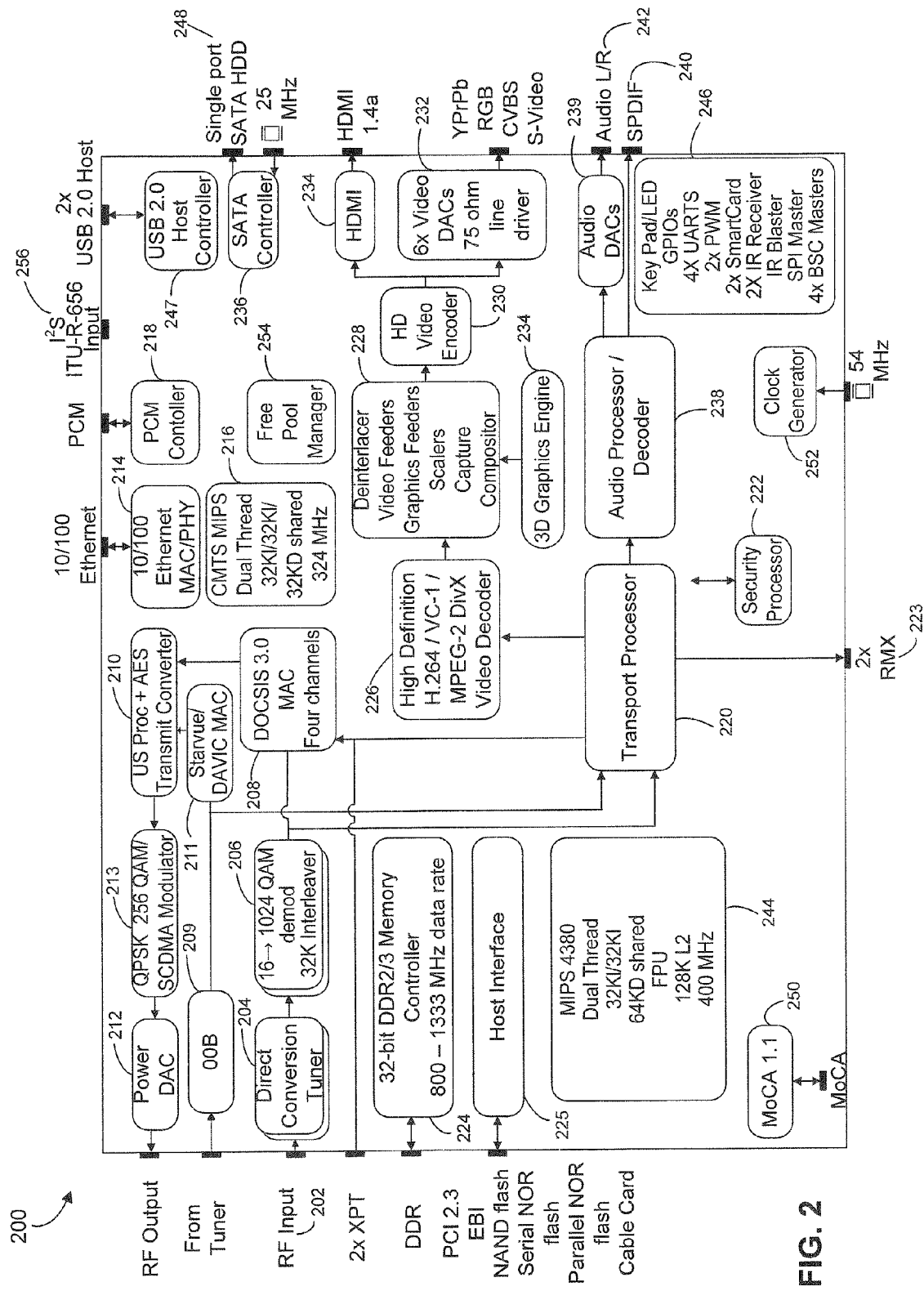
FIG. 2 depicts an exemplary system on an integrated circuit embodiment integrating a MoCA core and a cable tuner on the same integrated circuit.

FIG. 2 depicts an exemplary system on an integrated circuit 200 embodiment integrating a MoCA core and a cable tuner on the same integrated circuit. Radio Frequency ("RF") input data 202 from a television transmission is received by a direct conversion tuner 204. Direct conversion tuner 204 then converts a selected channel(s) of the television transmission to baseband. The baseband transmission is then be demodulated by the demodulator interleaver receiver 206.

If the system is being used for internet access, the output of the demodulator 206 is input into the DOCSIS MAC 208 for processing. In an embodiment, the DOCSIS subsystem combines two 1 GHz tuners 204, two 1064-QAM receivers 206, a 256-QAM upstream transmitter 210 with integrated 2 GHz power DACs 212, a Quadrature Phase-shift Keying ("QPSK") to 256-QAM advanced TDMA and SCDMA modulator 213, an Ethernet MAC/PHY 214, a DOCSIS MAC 208, and a dual-thread MIPS232 processor 216.

The integrated tuners 204 receive RF signals from external Low Noise Amplifiers (LNAs) in the 54-1002 MHz range and directly convert one or more channels to baseband signals. The internal Analog Front End ("AFE") and receivers 206 sample and demodulate the signal with recovered clock and carrier timing, filter and equalize the data and pass soft decisions to an Forward Error Correction ("FEC") decoder. The upstream transmitter 210 takes burst or continuous data, provides FEC encoding and pre-equalization, filters and modulates the data stream, and provides a direct 0-108 MHz analog output with output power control to the headend.

In an embodiment, an out-of-band ("OOB") receiver 209 receives a signal from the tuner, digitizes a Surface Acoustic Wave ("SAW") centered intermediate frequency, demodulates the signal with recovered clock and carrier timing, filters and equalizes the data, and incorporates a DigiCipher II/DAVIC compatible FEC decoder 211. A Pulse-code Modulation ("PCM") Highway Interface 218 is also included for interfacing to external voice Codec devices.

If the system is being used for cable modem functionality, a transport packet is sent from the demodulator 206 to the transport processor 220. The transport processor 220 processes the transport packet and removes any encryption. The system also includes a security processor 222 for providing secure boot key generation, management, and protection, and the security processor also assists in the processing of the transport packet. In an embodiment, the Data Transport Processor is an MPEG-2 DVB-compliant transport stream message/Packetized Elementary Stream ("PES") parser and demultiplexer capable of simultaneously processing 255 Proportional-integral-derivatives ("PIDs") via 255 PM channels in up to six independent transport stream inputs (selected from four external inputs and three internal inputs), and two internal playback channels. In an embodiment, the data transport supports decryption for up to 255 HD channels in all streams, and all 255 PID channels are used by the Record, Audio, and Video Interface Engine (RAVE), processors, message filter, as well as for output via the dual remux module 223. The data transport module RAVE supports 24 contexts, and each RAVE context is configured as either a record context for PVR functionality or as an Audio/Video ("AV") context to interface to audio and video decoders. The transport additionally provides 1DES/3DES/DVB/Multi2/AES descrambling support. A memory-to-memory DMA security module is programmed for supporting AES/1DES/3DES/CSS/CPRM/CPPM/DTCP copy protection algorithms/standards.

In an embodiment, the output data from the transport processor 220 is stored in memory (for example, DDR memory 224). A video decoder 226 retrieves this data from memory 224 and decode the data, and the data is further processed and enhanced by a deinterlacer and scalers 228 to improve data quality. The processed and enhanced video data is also be stored in memory 224 for later display. In an embodiment, the video decoder 226 is be capable of supporting high-definition AVC, VC-1, and Advanced Television Systems Committee ("ATSC") MPEG-2 streams. The video decoder 226 also supports high-definition VC-1 (Advanced Profile Level 3, Main, and Simple Profiles) and ATSC compliant MPEG-2, Main Profile at Main and High Levels.

In an embodiment, the CPU communicates 225 with the Host Controllers (HC) through the HC's operational registers and through data structures residing in shared system memory. In an embodiment, the host CPU is responsible for putting the data into external Dynamic Random Access Memory ("DRAM") from wherever the data is really being sourced (i.e., hard drive, Internet, transport memory buffer, etc.). Once the data has been put into external DRAM, a playback module is enabled to read the data from external DRAM and deliver it to RAVE, message, and/or remux modules.

During video processing, any graphics or additional video are combined just before being displayed, and the manipulated video are then sent to a video encoder(s) 230 for display, either through analog DAC outputs or through the High-Definition Multimedia Interface ("HDMI") interface. In an embodiment, the system includes a dual-stream analog video encoder 230 that supports Macrovision®1 and DCS Macrovision® and the following output standards: NTSC-M, NTSC-J, PAL-BDGHIN, PAL-M, PAL-Nc, and SECAM. In an embodiment, the following output formats are additionally supported: composite, S-video, SCART1, SCART2, RGB and YPrPb component, and the system supports output resolutions of 480i, 480p, 576i, 576p, 720p, 1080i, and 1080p. In an embodiment, six output DACs 232 are available to be shared amongst the output functions. The system also supports output over an HDMI interface 234. High quality video and graphics processing are integrated 234 into the integrated circuit, featuring advanced studio quality 2D/3D graphics processing while still maintaining efficient use of memory bandwidth.

Compressed video data enters the device in the form of MPEG transport streams. Transport streams come through the transport processor 220, which parse the transport streams to extract and, if necessary, decrypt elementary audio and video streams. Transport streams are stored directly into memory 224 for immediate display, or transport streams are routed to a storage interface such as SATA 236 for future use or for trick play and time shifting. Transport streams are also routed to a network interface such as Ethernet for home media-networking purposes (in-house distribution of content) and may also be sent over a transport remux output interface (serial).

Audio data is received from the transport processor 220 and processed by an audio processor and decoder 238. In an embodiment, the audio processor and decoder 238 is capable of decoding a broad range of formats including Dolby Digital, Dolby Digital Plus, AAC 5.1, AAC+Level 2, AAC+Level 4, WMA, and MPEG 1 Layer 1, 2, and 3 with simultaneous pass-through support. 3D SRS® Audio is also supported. The audio processor also supports advanced transcoding to DTS and includes audio DACs 239, and available audio outputs include an SPDIF 240 and analog outputs 242.

In an embodiment, motion adaptive de-interlacing with 3:2 pull-down and Letterbox Detection are included. Digital Noise Reduction support is also included to reduce mosquito noise and MPEG artifacts, including block noise, and digital contour removal is also supported for low bit rate AVC streams.

Embodiments incorporate a complete MIPS 4380 class microprocessor subsystem 244, including caches with bridging to memory and a local bus. NAND, parallel, and serial NOR flash are also supported.

Integrated peripherals 246 include UARTS, two ISO7816 smart card interfaces, counter/timers, General Purpose Input/Output ("GPIO"), keypad/LED controller, IR receivers, IR blaster, and Broadcom Serial Control ("BSC") and Serial Peripheral Interface ("SPI") controllers. Advanced connectivity features include two USB 2.0 ports 247 and Media Independent Interface (MII) capable of operating at 50 MHz or a Multimedia over Cable Alliance (MoCA) interface. A single port SATA interface 248 is also provided for PVR.

In an embodiment, Dynamic Power Management is implemented to support increasing power environment requirements including (among other sources) those from ENERGY STAR, The European Commission, Institute for Environment and Sustainability and the National Resources Defense Council (NRDC). In an embodiment, three power modes are implemented consistent with these specifications: (1) Passive Standby; (2) Active Standby; and (3) Active. Passive Standby Mode is a lowest power mode, wherein a product is connected to power, but wherein there is no active functionality. A device operating under Passive Standby mode may be "awakened" by external stimuli (or timer). In Active Standby Mode, a product may be connected to power with limited functionality that includes sending/receiving data from the front-end and/or network interfaces. A device operating under Active Standby Mode may be awakened by external stimuli (or timer) and/or in response to certain network data. Under Active Mode, full functionality is provided to a connected product. A Dynamic Power Management block controls Power Management transitions and is specifically designed so that Power Management and/or Power Management transitions do not introduce security vulnerabilities.

An embodiment may further include a MoCA subsystem 250. In an embodiment, the MoCA subsystem includes a PHY, MAC, and Network Interface. The MoCA module includes a fully embedded baseband processor and combines digital, analog, and RF elements. The embedded MIPS CPU implement the MoCA protocol, freeing the integrated circuit's primary processor from responsibility for MoCA link maintenance. The analog module includes a dual 11-bit ADC @ 200 MHz, a dual 1-bit DAC 2 400 MHz, and an embedded PLL, and the RF portion includes a tuner module along with separate TX/RX mixers, gain amplifiers, and filters.

Embodiments may also include an on-chip clock generator 252, a free pool generator 254, and an input 256 for streaming uncompressed PAL or NTSC Standard Definition TV signals using the TU-R Recommendation BT.656 protocol.

3.2 Bus Interface

Figure 3:
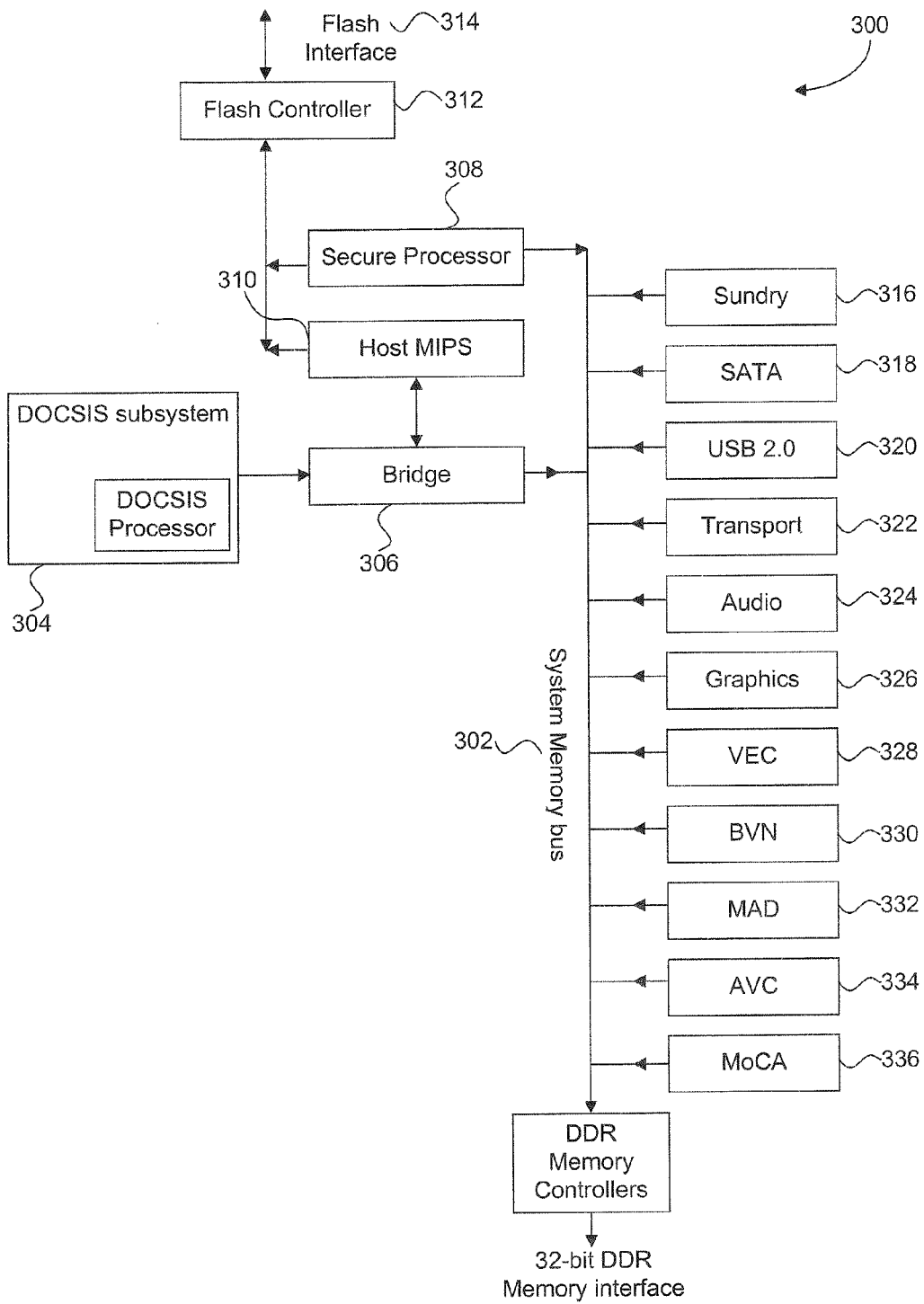
FIG. 3 depicts an exemplary bus interface in accordance with one embodiment.

FIG. 3 depicts an exemplary bus interface 300 that can be utilized with the various modules of the integrated circuit 200 in accordance with one embodiment. In an embodiment, modules comprising the integrated circuit 200 access system memory bus 302. In an embodiment, the DOCSIS subsystem 304 utilizes a separate bus, and the DOCSIS subsystem 304 accesses the system bus 302 through a bridge 306.

In an embodiment, only the secure processor 308 and the host MIPS 310 directly accesses the flash controller 312 and the flash memory through the flash interface 314. Restricting access to the flash memory provides enhanced security. In an embodiment, the host is more secure than the DOCSIS subsystem, and if the DOCSIS subsystem 304 is allowed direct access to flash memory, unauthorized users may download software through the DOCSIS interface and reach flash memory.

In an embodiment, the modules connected to the system memory bus include a Sundry module 316 (a peripheral module controlling interfaces external to the set-top box), a SATA interface 318, a USB 2.0 host interface 320, the transport processor 322, an audio processor 324, a graphics engine 326, a video encoder (VEC) 328 for formatting video, a Broadcom Video Network (BVN) video processor 330 (which contains scalers and works with the video encoder 328), a Motion Adapter Deinterlacer (MAD) module 332 (for recovering a stream for processing for outgoing HD), an Advanced Video Codec (AVC) module 334, and a MoCA module 336.

3.4 MoCA Subsystem

Figure 4:
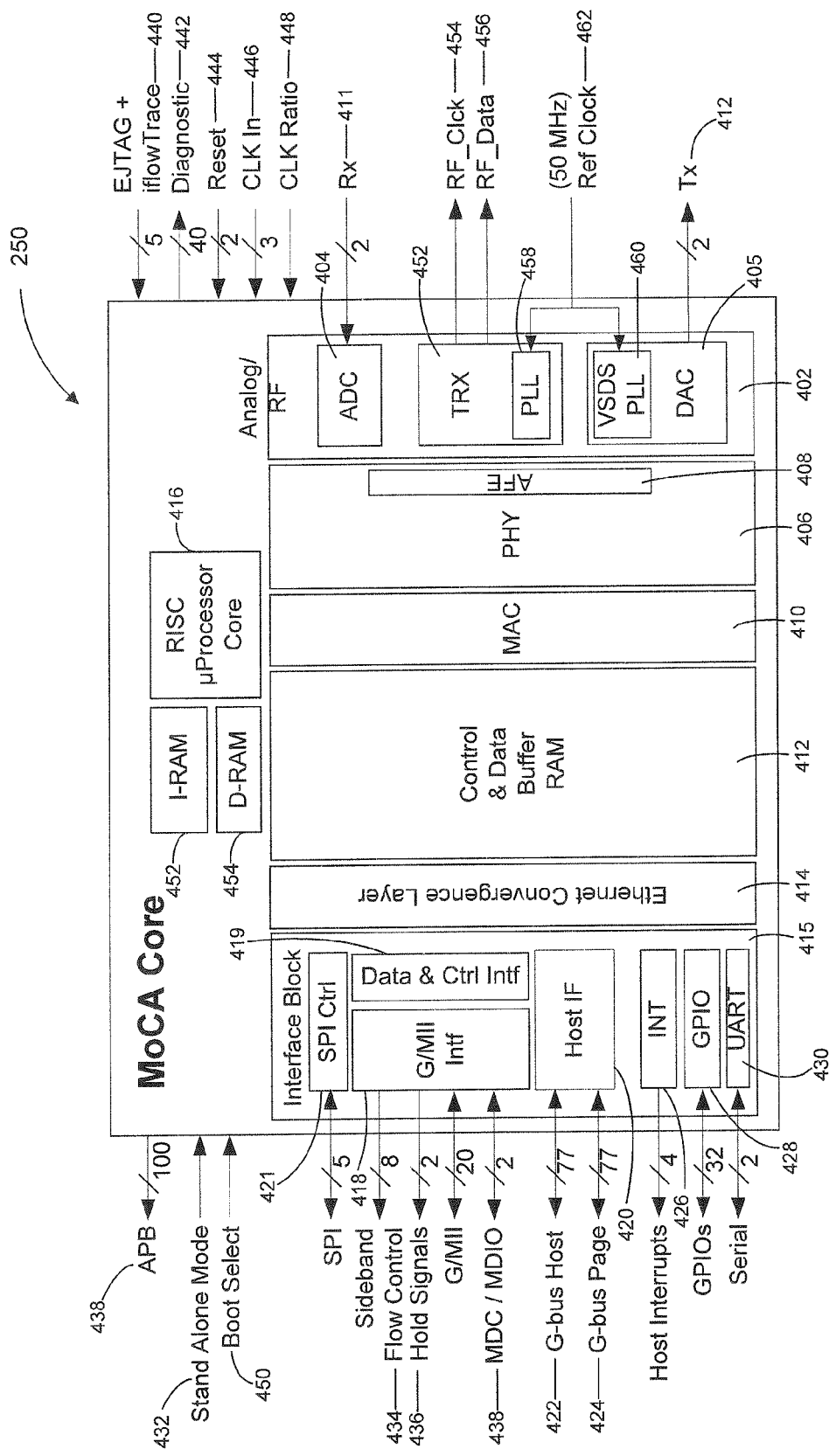
FIG. 4 depicts a block diagram of a MoCA core in accordance with one embodiment.

FIG. 4 depicts a block diagram of a MoCA subsystem 250 in accordance with one embodiment. In an embodiment, the MoCA subsystem 250 consists of a MoCA PHY processor (PHY) 406 (which include a digital baseband PHY and an Analog Front End (AFE) 408 associated with Analog/RF block 402), a MoCA packet processor (MAC) 410, an Ethernet convergence layer (ECL) 414, an interface block 415, and an embedded CPU 416 and subsystem enabling the autonomous operation of a MoCA port in a system. The embedded CPU 416 is configured to access (and run code from) memory 224 directly through the system bus 302, and the embedded CPU handshakes with the main CPU of the integrated circuit. This functionality allows the MoCA subsystem to act autonomously with respect to the CPU of the integrated circuit.

Analog interface 402 includes an analog to digital converter (ADC) 404. In an embodiment, the PHY 406 is configured to receive 411 the digital signals from the MAC 410 and convert them to analog (using a digital to analog converter (DAC) 405) for transmission 412. The transmitter 452 receives frame data and control signals from the MAC layer and prepare them to be transmitted on the coax line. The transmitter 452 is configured to transmit signals RF-Clck 454 and RF_Data 456. Both the transmitter 452 and the DAC 405 receives clock signals (458 and 460) from a reference clock 462.

In an embodiment, the MoCA subsystem receives data and control messages encapsulated in Ethernet packets via the Gigabit Media Independent Interface (G/MII) 418 and a data and control interface 419. The G/MII interface 418 is used for MoCA or as a generic G/MII interface, and the G/MII interface 418 is configured to interface with an external Ethernet block 214. The MoCA subsystem is managed by an external host via MoCA Management Protocol (MMP), using Management Data Input/Output ("MDIO") signals input into Management Data Clock/Management Data Input/Output Interface MDC/MDIO 438.

An Ethernet Convergence Layer ("ECL") 414 classifies incoming Ethernet frames based on their MAC and/or 802.1Q tag and map the Ethernet packets to the appropriate MoCA destination node. The ECL 414 also handles Unicast, Multicast and Broadcast transmissions. A side signal enables bypassing the ECL 414 classifier with a classifying signal that arrives directly from the external host through host interface 420. The classified Ethernet frames are stored in their associated queues in the internal data buffers 412. In an embodiment, the ECL 414 converts MoCA data to Ethernet format before the data is sent to the G/MII 418. Data sent from the G/MII 418 goes to an Ethernet MAC before it reaches the system memory bus 302.

In an embodiment, the MAC 410 is configured to handle the following: MoCA network management including initialization, admission control, link management, topology management and privacy management; network scheduling including Reservation Request and Media Access Plan (MAP); and packet processing as specified in the MoCA 1.0 and 1.1 Specifications. The MAC 410 encapsulates Ethernet packets received from the ECL 414 into MoCA frames and deliver them to the PHY 406 for transmission over coaxial cable. On the opposite path, the MAC decapsulates the Ethernet frames from the MoCA frames received from the PHY and transfer them over the G/MII interface 418. The PHY 406 performs the physical transmission and reception of data packets according to MoCA 1.0 Specifications.

When the G/MII interface 418 is exported, the MoCA subsystem appears as an Ethernet PHY to an external MAC. In an embodiment, the MoCA Core G/MII interface is full duplex and supports IEEE 802.x Flow Control 434 causing data transfer to pause 436 when the MoCA Core can not receive new packets.

The host interface 420 includes a serial peripheral interface (SPI) for general configuration, a generic interface for message passing and boot (G-Bus Host) 422, and a generic interface for code paging via DMA (G-Bus page) 424. The interface block further includes interfaces for host interrupts 426, general purpose input and output 428, and a serial interface for debugging (UART—Universal Asynchronous Receiver/Transmitter) 430.

In an embodiment, the MoCA subsystem supports a Stand Alone Mode 432. In this mode, the MoCA subsystem will act as a MoCA modem, and the MoCA G/MII 418 connects directly to a G/MII port on an integrated circuit. The MoCA subsystem may additionally be configured to work as an Ethernet interface, which removes the need for an additional Ethernet MAC on-chip, allowing for a more efficient design.

In an embodiment, the MoCA subsystem connects to an APB bus 438 used to configure the memory to memory DMA dedicated for the MoCA. The MoCA subsystem may also be configured to send diagnostic 442 signals and to receive signals through CPU debug (EJTAG) and trace (iflowTrace) interfaces 440. The MoCA subsystem may also include inputs for reset 444, clock in 446, clock ratio 448, and boot select 450 signals, and on-chip I-RAM 452 and D-RAM 454 may be included.

4. Conclusion

The above system and process may be implemented as a computer program executing on a machine, as a computer program product, or as a computer-readable medium.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system on an integrated circuit, comprising:
a memory controller;
a shared memory coupled to the memory controller, wherein code in the shared memory is authenticated before the code is run;
a cable tuner integrated on a substrate;
a Multimedia Over Coax Alliance (MoCA) subsystem integrated on the substrate, wherein the cable tuner and the MoCA subsystem are configured to communicate with a network over a shared coaxial cable;
a Data Over Cable Service Interface Specification (DOCSIS) subsystem integrated on the substrate, the DOCSIS subsystem comprising a DOCSIS processor;
a video/audio subsystem, integrated on the substrate; and
a host processor configured to directly access the memory controller, wherein the DOCSIS subsystem is configured to access the host processor before the DOCSIS subsystem accesses the memory controller.

2. The system of claim 1, wherein the MoCA subsystem is configured to operate autonomously, with respect to the host processor, via an embedded processor in the MoCA subsystem.

3. A system on an integrated circuit, comprising:
a memory controller;
a shared memory coupled to the memory controller, wherein code in the shared memory is authenticated before the code is run;
a cable tuner integrated on a substrate;
a Multimedia Over Coax Alliance (MoCA) subsystem integrated on the substrate;
a video/audio subsystem integrated on the substrate;
a Data Over Cable Service Interface Specification (DOCSIS) subsystem integrated on the substrate, the DOCSIS subsystem comprising a DOCSIS processor; and
a host processor configured to directly access the memory controller, wherein the DOCSIS subsystem is configured to access the host processor before the DOCSIS subsystem accesses the memory controller.

4. The system of claim 3, wherein the shared memory is a Double Data Rate (DDR) memory.

5. The system of claim 3, wherein the shared memory is a flash memory, and wherein the DOCSIS subsystem is prevented from accessing the flash memory directly.

6. The system of claim 5, wherein the host processor has a Microprocessor without Interlocked Pipeline Stages (MIPS) architecture.

7. The system of claim 3, wherein the host processor is an audio/video processor.

8. The system of claim 3, wherein the MoCA subsystem is configured to operate independently, with respect to the host processor, via an embedded processor in the MoCA subsystem.

9. The system of claim 3, wherein the MoCA subsystem includes:
a PHY,
a MAC,
a network interface, and
a baseband processor, wherein the baseband processor is configured to combine digital, analog, and RF signals.

10. The system of claim 3, further comprising a transport processor configured to:
receive transport packets from a tuner, and
output data to a video decoder and an audio decoder.

11. A system comprising:
a first cable set top box including:
a memory controller,
a shared memory coupled to the memory controller, wherein code in the shared memory is authenticated before the code is run,
a first cable tuner,
a first Multimedia Over Coax Alliance (MoCA) subsystem,
a first Data Over Cable Service Interface Specification (DOCSIS) subsystem comprising a DOCSIS processor,
a first video/audio subsystem integrated on a first integrated circuit in the first cable set top box, and
a host processor configured to directly access the memory controller, wherein the first DOCSIS subsystem is configured to access the host processor before the first DOCSIS subsystem accesses the memory controller; and
a second cable set top box including a second cable tuner, a second MoCA subsystem, a second DOCSIS subsystem, and a second video/audio subsystem integrated on a second integrated circuit in the second cable set top box,
wherein the first cable set top box and the second cable set top box are connected to a local area network (LAN), and
wherein the first cable tuner, the second cable tuner, the first MoCA subsystem, and the second MoCA subsystem are configured to communicate over a shared coaxial cable link.

12. The system of claim 11, wherein the first cable set top box is configured to receive internet data, and wherein the first cable set top box is configured to send the internet data via the first MoCA subsystem to the second cable set top box.

13. The system of claim 11, wherein the first cable set top box is configured to receive television data, and wherein the first cable set top box is configured to send the television data via the first MoCA subsystem to the second cable set top box.

14. The system of claim 11, wherein the second cable set top box is configured to store the television data via a SATA subsystem in the second cable set top box.

15. A system, comprising:
a memory controller;
a shared memory coupled to the memory controller, wherein code in the shared memory is authenticated before the code is run;
a video/audio subsystem integrated on a substrate of a cable set top box;
a Data Over Cable Service Interface Specification (DOCSIS) subsystem integrated on the substrate, the DOCSIS subsystem comprising a DOCSIS processor;
a bridge coupled to the DOCSIS subsystem, the host processor, and the shared memory;
a host Microprocessor without Interlocked Pipeline Stages (MIPS) coupled to the bridge and configured to directly access the memory controller, wherein the DOCSIS subsystem is configured to access the host MIPS over the bridge before the DOCSIS subsystem accesses the memory controller to prevent direct access by the DOCSIS subsystem to the memory controller; and a first Multimedia Over Coax Alliance (MoCA) subsystem integrated on the substrate, wherein the first MoCA subsystem includes an embedded processor, and wherein the embedded processor is configured to access the code from the shared memory autonomously with respect to the host MIPS.

16. The system of claim 15, further comprising:
a secure processor, wherein the secure processor and the host MIPS are configured to access the shared memory directly via a memory interface coupling the memory controller and the shared memory.

17. The system of claim 16, wherein the secure processor is further configured to generate a secure boot key.

18. The system of claim 16, further comprising:
a system memory bus coupled to the secure processor and the bridge, wherein the DOCSIS subsystem is configured to access the system memory bus over the bridge.

19. The system of claim 18, further comprising:
a second memory controller coupled to the system memory bus.

20. The system of claim 15, wherein the embedded processor is further configured to access and run the code from the shared memory via a system bus.

21. The system of claim 15, wherein the DOCSIS subsystem and the video/audio subsystem are configured to operate concurrently.

* * * * *